(12) United States Patent
Flacht et al.

(10) Patent No.: US 9,334,919 B2
(45) Date of Patent: May 10, 2016

(54) HYDRAULIC DAMPER WITH ADJUSTABLE REBOUND VALVE ASSEMBLY

(75) Inventors: Piotr Andrzej Flacht, Cracow (PL); Radoslaw Pawel Grzesik, Cracow (PL)

(73) Assignee: Beijing West Industries Co. Ltd., Beijing (CN)

( * ) Notice: Subject to any disclaimer, the term of this patent is extended or adjusted under 35 U.S.C. 154(b) by 0 days.

(21) Appl. No.: 14/353,221

(22) PCT Filed: Mar. 27, 2012

(86) PCT No.: PCT/CN2012/073128
§ 371 (c)(1),
(2), (4) Date: Apr. 21, 2014

(87) PCT Pub. No.: WO2013/143070
PCT Pub. Date: Oct. 3, 2013

(65) Prior Publication Data
US 2015/0204410 A1 Jul. 23, 2015

(51) Int. Cl.
*F16F 9/34* (2006.01)
*F16F 9/512* (2006.01)
*F16F 9/348* (2006.01)

(52) U.S. Cl.
CPC ............... *F16F 9/512* (2013.01); *F16F 9/348* (2013.01); *F16F 9/5126* (2013.01)

(58) Field of Classification Search
CPC .................................. F16F 9/512; F16F 9/5126
USPC .............. 188/282.8, 282.9, 322.13, 322.14, 188/322.15, 322.22
See application file for complete search history.

(56) References Cited

U.S. PATENT DOCUMENTS

| 3,724,615 A | 4/1973 | Stormer |
| 3,889,787 A * | 6/1975 | Zehring et al. ............ 188/322.15 |
| 4,356,898 A * | 11/1982 | Guzder et al. ............ 188/322.15 |
| 4,747,475 A * | 5/1988 | Hagwood et al. .......... 188/282.9 |
| 6,655,512 B2 * | 12/2003 | Moradmand et al. .... 188/322.15 |
| 2002/0063023 A1 | 5/2002 | Moradmand et al. |
| 2005/0183911 A1 * | 8/2005 | Wilda et al. .............. 188/322.15 |
| 2007/0034466 A1 | 2/2007 | Paesmans et al. |

FOREIGN PATENT DOCUMENTS

| CN | 102102730 A | 6/2011 |
| EP | 1241372 A2 | 9/2002 |
| EP | 2113679 A1 | 11/2009 |
| GB | 2090948 A | 7/1982 |

OTHER PUBLICATIONS

International Search Report, Dec. 14, 2012, 3 pages.

\* cited by examiner

*Primary Examiner* — Thomas J Williams
(74) *Attorney, Agent, or Firm* — Dickinson Wright PLLC

(57) ABSTRACT

A hydraulic damper (1) includes an orifice plate (33) provided with an axial projection (334) and a number of rebound flow passages (332) disposed around the projection (334). A deflectable disc (91) and an elliptical disc (92) is disposed slidably one on top of the other over the axial projection (334) to cover a compression side of the rebound flow passages (332). A cage member (34) is fixed to a piston assembly at the compression side thereof and is provided with at least one passage (341, 343). A compression spring (95) is preloaded between the cage member (34) and the discs (91, 92) to normally close the compression side of the rebound flow passages (332).

8 Claims, 4 Drawing Sheets

HYDRAULIC DAMPER WITH ADJUSTABLE REBOUND VALVE ASSEMBLY

CROSS REFERENCE TO RELATED APPLICATION

This application claims the benefit of PCT International Application Serial No. PCT/CN2012/073128 filed on Mar. 27, 2012, and entitled "Hydraulic Damper With Adjustable Rebound Valve Assembly".

The present invention relates to a hydraulic damper, in particular a motor vehicle suspension damper, comprising at least one tube filled with working liquid, inside of which a slidable piston assembly attached to a piston rod led outside the damper through a sealed rod guide and provided with rebound and compression valve assemblies to control the flow of working liquid passing through the piston assembly during rebound and compression stroke of the damper, is disposed dividing the tube into a compression chamber and a rebound chamber, wherein the piston assembly comprises a body fixed to the piston rod and provided with at least one passage to allow free flow of working liquid between the rebound chamber and an internal chamber in said piston body, an orifice plate provided with through rebound flow means, rebound valve means which cover the compression side of said through rebound flow means, a cage member fixed to the piston assembly at the compression side thereof and provided with at least one passage to allow free flow of working liquid between the compression chamber and an internal chamber of said cage member, and a compression spring preloaded between the compression side of said cage member and said rebound valve means acting on said rebound valve means to normally close said compression side of said through rebound flow means.

Hydraulic dampers of this kind are disclosed e.g. in European patent specification EP 1 241 372 B1 or U.S. patent specification U.S. Pat. No. 3,621,949, where said through rebound flow means have a form of a rebound flow passage extending centrally through said orifice plate along the axis of the damper and said rebound valve means have a form of a substantially rigid disc. Dampers of this kind provide blow-off characteristics during rebound stroke of the damper enabling to achieve different rates of damping force in dependence of the velocity of the piston assembly, where for low velocities observable e.g. during vehicle cornering manoeuvres the damping force increases rapidly, while for larger piston velocities observable e.g. when the vehicle travels over boulder paving the damper provides smaller rates of increase of the damping force, providing a quasi sigmoid characteristic of a damping force vs. piston velocity during the rebound stroke.

A damping force vs. piston velocity characteristics of such dampers for a rebound stroke comprises two substantially linear sections of different inclinations wherein the inclination of the first section, greater than the inclination of the second section relates to a rudimental rebound flow of working liquid through the compression valve assembly of the piston assembly, whereas the second inclination is determined mainly by working fluid flow restrictions generated by the central rebound flow passage of the opened blow-off rebound valve assembly.

The point of inflexion of such a force to velocity characteristics of a damper is known as a knee point. However in this type of blow-off rebound valve assembly where a centrally situated substantially rigid disc is preloaded by the compression spring, in a result of substantial differentiation of the spring reaction forces over the circumference of the disc relatively low repeatability of opening moment of such a valve assembly occurs, resulting in uncertainty of a knee point location and unpredictable deviation of the observable force to velocity characteristics from the theoretical one. Furthermore in the above described prior art dampers only the inclination of the second section of the characteristic and a location of a knee point may be adjusted by appropriate selection of the stiffness and preload of a compression spring.

Therefore the object of the present invention has been to provide a hydraulic damper, having a rebound valve means with a blow-off valve, sharing substantially the same operating characteristics both within the same dampers production batch, as well as within the same operating conditions. Another object of the present invention has been to provide a hydraulic damper enabling for adjustment of its operational characteristics during the rebound stroke that would provide higher tuning range than dampers known from the prior art.

In order to accomplish the aforementioned and other objects, in a hydraulic damper of the kind mentioned in the outset, according to the present invention said orifice plate is further provided with an axial projection and said through rebound flow means have a form of a number of rebound flow passages disposed around said projection, and said rebound valve means comprise a deflectable disc and an elliptical disc disposed slidably one on top of the other over said axial projection.

Preferably said rebound valve means further comprise a spring seat disposed slidably on the elliptical disc over said axial projection of the orifice plate and having a substantially cylindrical sleeve part. The spring seat equalizes the spring reaction forces over the circumference of the elliptical disc In such a case preferably said rebound valve means further comprise an O-ring seal located within the internal annular recess of the spring seat. O-ring seal improves assembling of the piston unit and provides another tuning parameter.

Preferably said cage member has an internal sleeve defining the guide for the compression spring. The guide improves positioning the spring and thus increases repeatability of the damper characteristic within the same operating conditions.

Preferably said rebound flow passages are disposed equi-angularly around said projection of the orifice plate.

In order to further equalize the spring reaction forces over the circumference of the elliptical disc, preferably said compression spring is a wave spring.

The term "rebound" as used in this specification with reference to particular elements of the damper means, these elements or these parts of particular elements which point toward the piston rod or in a case of a flow direction of the working liquid it refers to this flow direction that takes place during the rebound stroke of a damper. Similarly the term "compression" as used herein with reference to particular elements of the damper means, these elements or parts of elements which point in a direction opposite to the piston rod or in a case of a flow direction of the working liquid it refers to this flow direction that takes place during the compression stroke of a damper.

The principles and exemplary embodiments of the invention are presented below in connection with the attached drawings on which:

Figure 1:
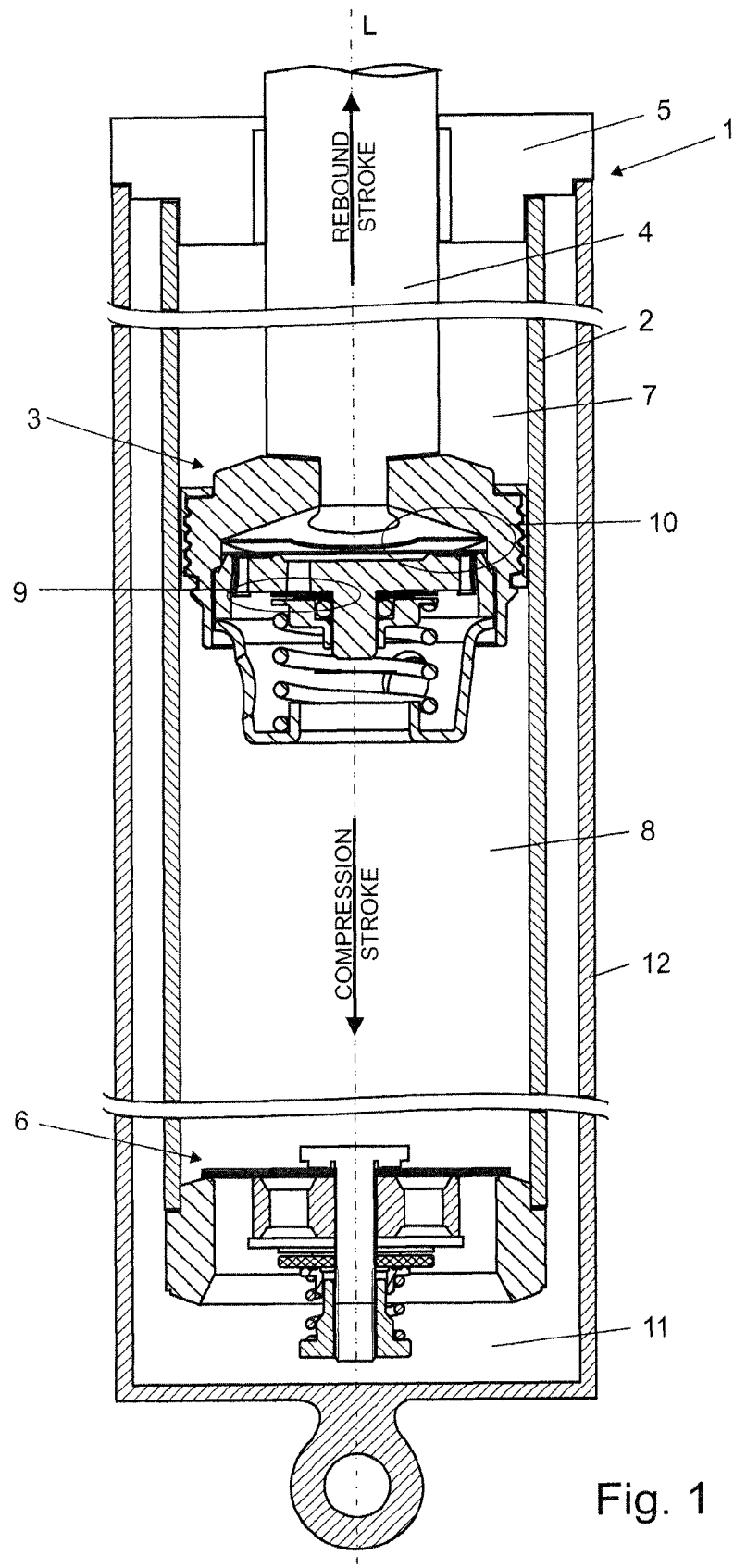
FIG. 1 is a schematic cross-sectional view of a twin-tube hydraulic damper showing its main components and provided with an embodiment of the piston assembly according to the present invention.

A hydraulic damper 1 shown in FIG. 1 is an example of a twin-tube damper. Inside of an internal tube 2 filled with working liquid a movable piston assembly 3 is placed. The piston assembly 3 is attached to a piston rod 4 led axially outside the damper 1 through a sealed piston rod guide 5. At the other end of the tube 2 a base valve assembly 6 is placed. The piston assembly 3 makes a sliding fit with the inner surface of the tube 2 and divides the tube 2 into a rebound chamber 7 and a compression chamber 8. The piston assembly 3 further comprises rebound 9 and compression 10 valve assemblies having flow passages, to control the flow of working liquid passing through the piston assembly 3 during the rebound and the compression stroke of the damper 1. The base valve assembly 6 is also provided with rebound and compression valve assemblies with flow passages, to control the flow of working liquid passing between the compression chamber 8 and the reservoir chamber 11 formed between the inner tube 2 and the outer tube 12 of the damper 1.

Figure 2:
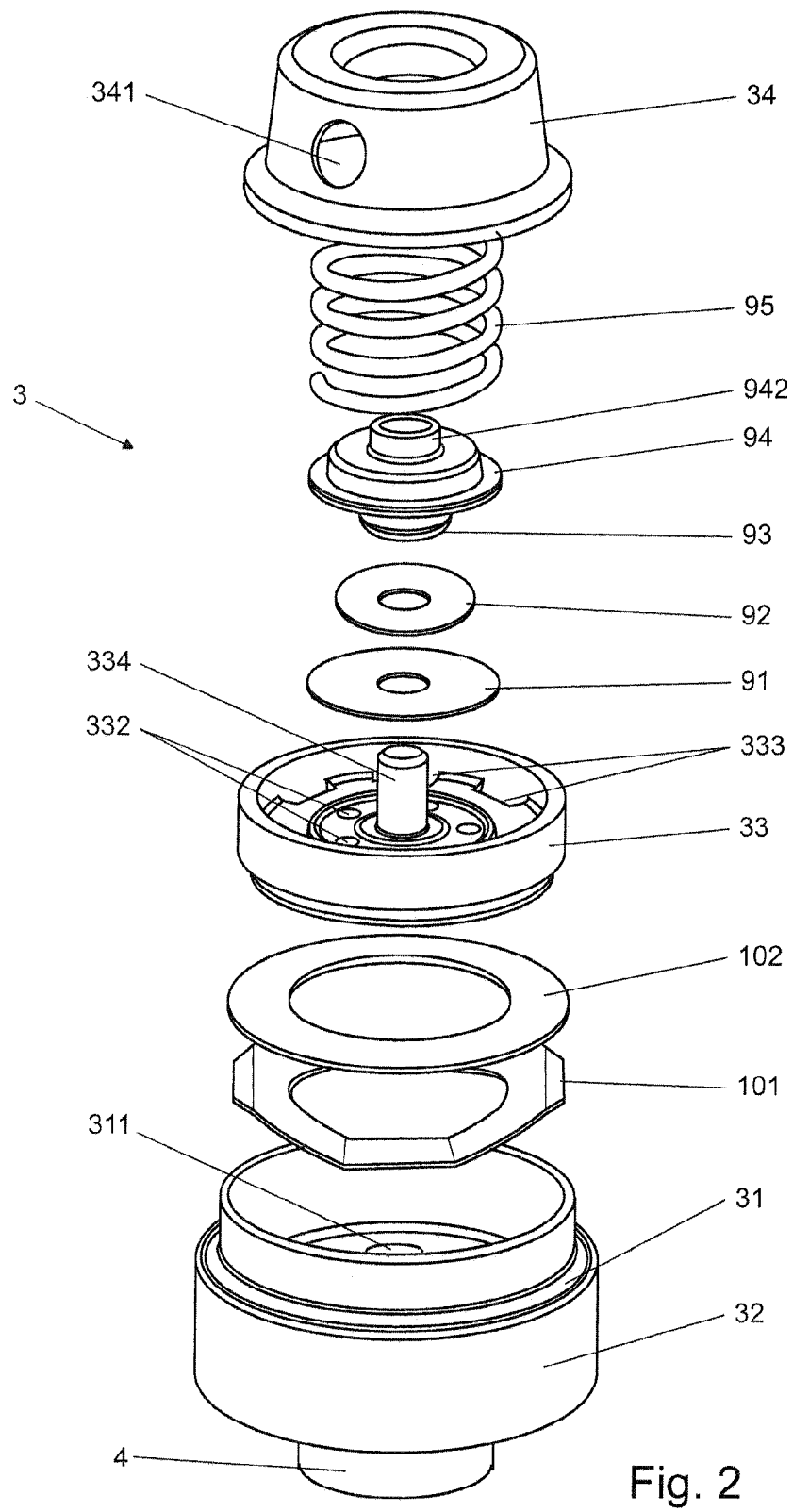
FIG. 2 is an exploded perspective view of the piston assembly shown in FIG. 1.
Figure 3:
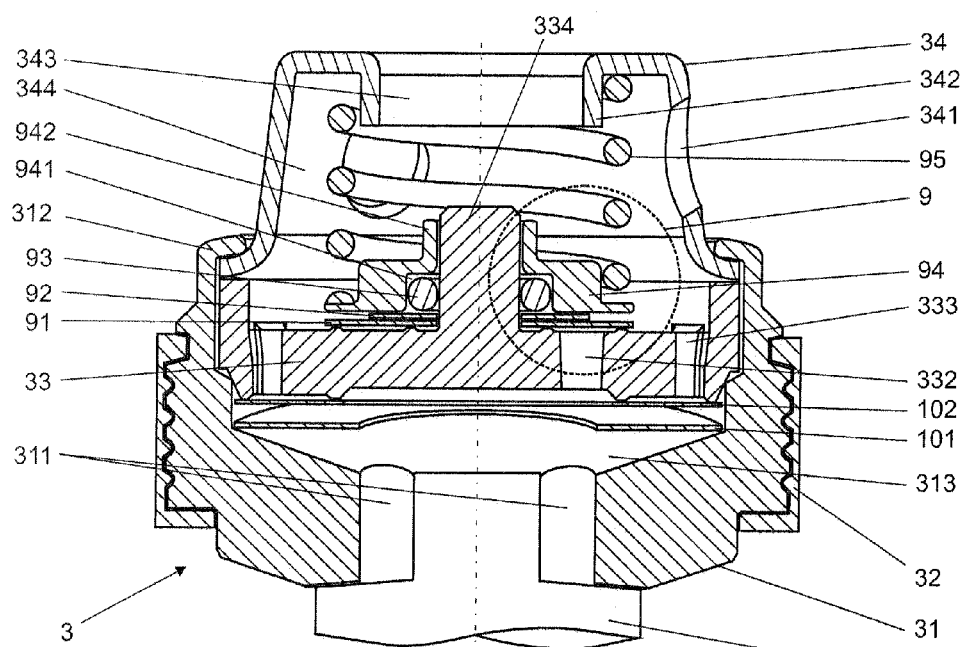
FIG. 3 is a schematic cross-sectional view of the piston assembly shown in FIG. 1.

As shown in FIG. 2 and FIG. 3, the piston assembly 3 comprises a hollow body 31 fixed in any suitable manner (e.g. screwed) to the piston rod 4 and provided with passages 311 to allow free flow of working liquid between the rebound chamber 7 and the internal chamber 313 and then to the compression chamber 8 through the rebound 9 or compression 10 valve assembly. The body 31 is provided with an outer annular seal 32 of Teflon material, which makes a sealing sliding fit with the inner surface the internal tube 2.

Further, the piston assembly 3 comprises a cylindrical orifice plate 33 provided with a number of equiangularly disposed compression flow passages 333, a number of equiangularly disposed rebound flow passages 332 positioned radially inwardly of the compression flow passages 333, and an axial projection 334.

The piston assembly 3 is closed by a cage member 34 fixed to the body 31 by clamping the annular lips 312 of the body over the annular edge of the cage member 34. The cage member 34 is also provided with an internal sleeve 342 that defines the guide for the compression spring 95, as shall be explained later, and an axial passage 343. The passage 343, as well as a number of passages 341 in the side wall of the cage member 34 allow free flow of working liquid between the compression chamber 8 and the internal chamber 344 of the cage member 34 and then to the rebound chamber 7 through the rebound 9 or compression 10 valve assembly.

The compression valve assembly 10 disposed inside the body 31 contains a spring element 101 and a deflectable floating disc 102. The spring element 101 disposed between the rebound side of the internal chamber 313 and the floating disc 102 presses on the disc 102 to normally close the rebound side of the compression flow passages 333 in the orifice plate 33.

The rebound valve assembly 9 of the piston assembly 3 comprises a working deflectable disc 91, an elliptical disc 92 and a spring seat 94 all disposed slidably over the projection 334, and an O-ring seal 93 located in the internal annular recess 941 of the spring seat 94. The spring seat 94 has a substantially cylindrical sleeve part 942 having an internal diameter slightly larger than the external diameter of the projection 334. A compression spring 95 is disposed between the spring seat 94 and the cage member 34 of the piston assembly 3 and is preloaded upon mounting the piston assembly 3 elements together to normally close the compression side of the rebound flow passages 332 in the orifice plate 33.

During the compression stroke of the damper, working liquid flows from the compression chamber 8 through the axial passage 343 and annular passages 341 of the cage member 34 and then through the compression flow passages 333 in the cylindrical orifice plate 33. Under pressure of liquid in the compression chamber 8 the floating disc 102 is pushed away from the rebound side of the passages 333 against the spring element 101 to allow the flow of the liquid through the passages 311 to the rebound chamber 7. Reaction of the spring element 101 provides the reaction force of the damper during its compression stroke which reaction is dependent on the velocity of the piston rod 4.

Figures 4A, 4B:
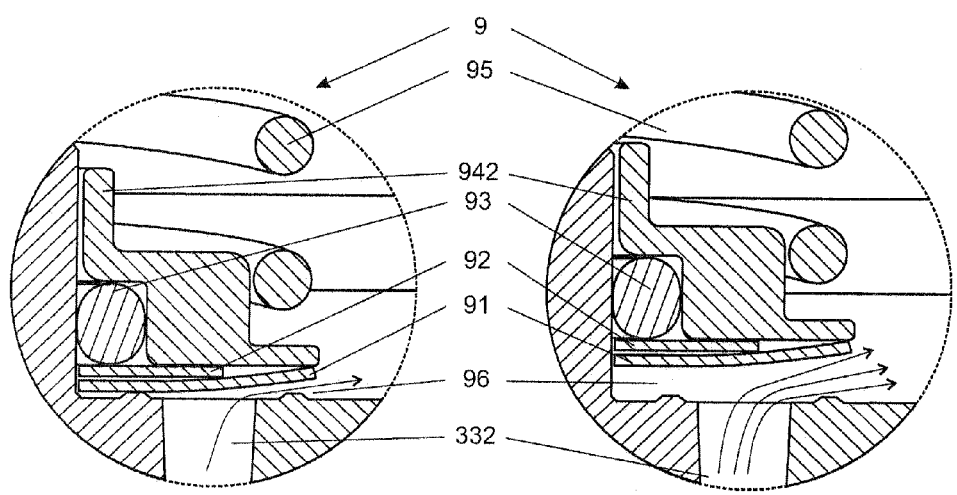
FIGS. 4a and 4b are enlarged cross-sectional views of the rebound valve assembly of the piston assembly shown in FIG. 3 in the first and in the second mode of operation, and FIG. 5 schematically illustrates adjustment parameters of a force vs. piston velocity characteristic of a damper constructed according to the principles of the invention.
Figure 5:
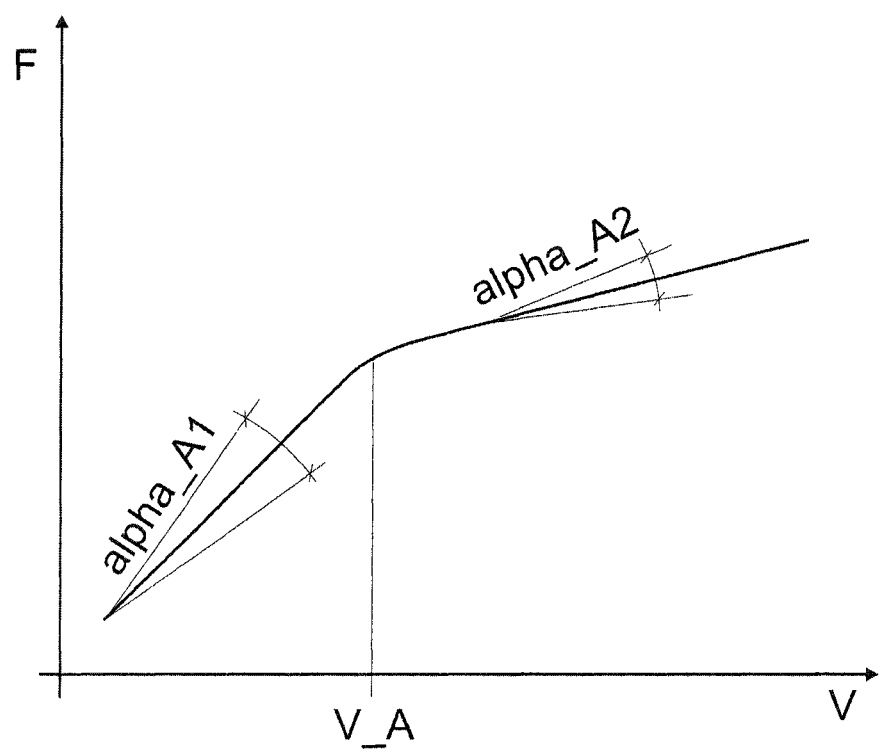

FIG. 4a, FIG. 4b and FIG. 5 depict two modes of operation of the rebound valve assembly 9 during rebound stroke of the damper.

As shown in FIG. 4a, the pressure of the working liquid acting through the rebound flow passages 332 on the rebound surface of the disc 91 lead to its deflection over the edge of the elliptical disc 92 and created a narrow gap 96 enabling the restricted flow of the liquid through the rebound flow passages 332 to the internal chamber 344 of the cage member 34. This is the first mode of operation of the rebound valve assembly 9 corresponding to slow velocities of the piston assembly 3, featuring some coefficient (alpha_A1) of increase of damping force in dependence of the velocity of the piston assembly 3.

After reaching certain predefined piston velocity threshold (V_A) e.g. 0.2 to 0.5 m/s, when the pressure under the rebound surface of the disc 91 deflected to its maximum exceeds the preload of the spring 95 and the friction of the O-ring seal 93 the rebound valve assembly 9 switches to the second mode of operation. In this second mode of operation the gap 96 between the compression side of the rebound flow passages 332 and the rebound surface of the disc 91 is substantially larger, so that restrictions created by the rebound valve assembly 9 are substantially lower and the coefficient (alpha_A2) of increase of the damping force with regard to velocity of the piston assembly 3 is substantially smaller than the first coefficient (alpha_A1).

The rebound valve assembly 9 according to the present invention enables not only to adjust this point of inflexion of the force to velocity characteristic of the damper but also individual coefficients "alpha_A1" and "alpha_A2" corresponding to the two distinctive modes of operation of the damper 1.

The first mode of operation (alpha_A1) may be tuned by appropriate selection of, among others, the width and diameters of the elliptical disc 92, the width and elasticity of the deflectable disc 91, the external diameter of the spring seat 94. The velocity threshold (V_A) may be tuned by appropriate selection of, among others, the elasticity of the spring 95 and dimensions and material of the O-ring seal 93. The second mode of operation (alpha_A2) may be tuned by appropriate selection of, among others, the number and the area of the rebound flow passages 332 in the cylindrical orifice plate 33.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper, in particular a motor vehicle suspension damper (1), comprising:

at least one tube (2) filled with working liquid, inside of which a slidable piston assembly (3) provided with rebound (9) and compression (10) valve assemblies is disposed dividing the tube into compression (8) and rebound (7) chambers to control the flow of working liquid passing through the piston assembly (3) during rebound and compression stroke of the damper, the piston assembly comprises a body (31) fixed to a piston rod led outside the damper through a sealed rod guide (5) and provided with at least one passage (311) to allow free flow of working liquid between the rebound chamber (7) and internal chamber (313) in said piston body, an orifice plate (33) provided with through rebound flow means, rebound valve means which cover compression side of said through rebound flow means, a cage member (34) fixed to the piston assembly at the compression side thereof and provided with at least one passage (341, 343) to allow free flow of working liquid between the compression chamber (8) and an internal chamber (344) of said cage member, a compression spring (95) preloaded between the compression side of said cage member (34) and said rebound valve means acting on said rebound valve means to normally close said compression side of said through rebound flow means, said orifice plate (33) further provided with an axial projection (334) and said through rebound flow means having a form of a number of rebound flow passages (332) disposed around said projection (334), and in that said rebound valve means comprise a deflectable disc (91) and an elliptical disc (92) disposed slidably one on top of the other over said axial projection (334), and said rebound valve means further comprising a spring seat (94) slidably disposed on the elliptical disc (92) over said axial projection (334) of the orifice plate (33) and having a substantially cylindrical sleeve part (942), and an O-ring seal (93) located within an internal annular recess (941) of the spring seat (94).

2. The hydraulic damper according to claim 1, wherein said cage member (34) has an internal sleeve (342) defining the guide for the compression spring (95).

3. The hydraulic damper according to claim 1, wherein said rebound flow passages (332) are disposed equiangularly around said projection (334) of the orifice plate (33).

4. The hydraulic damper according to claim 1, wherein said compression spring (95) is a wave spring.

5. The hydraulic damper according to claim 1, wherein a first mode of operation (alpha_A1) of the damper during rebound stroke corresponding to low piston assembly (3) velocity range is adjustable by at least one parameter selected from the width and diameters of the elliptical disc (92), the width and elasticity of the deflectable disc (91) and the external diameter of the spring seat (94).

6. The hydraulic damper according to claim 5, wherein a second mode of operation (alpha_A2) of the damper during rebound stroke corresponding to high piston assembly (3) velocity range is adjustable by at least one parameter selected from the number and the area of the rebound flow passages (332) in the cylindrical orifice plate (33).

7. The hydraulic damper according to claim 1, wherein the hydraulic damper has a form of a mono-tube damper or a twin-tube damper.

8. A hydraulic damper, in particular a motor vehicle suspension damper (1), comprising:

at least one tube (2) filled with working liquid, inside of which a slidable piston assembly (3) provided with rebound (9) and compression (10) valve assemblies is disposed dividing the tube into compression (8) and rebound (7) chambers to control the flow of working liquid passing through the piston assembly (3) during rebound and compression stroke of the damper, the piston assembly comprises a body (31) fixed to a piston rod led outside the damper through a sealed rod guide (5) and provided with at least one passage (311) to allow free flow of working liquid between the rebound chamber (7) and internal chamber (313) in said piston body, an orifice plate (33) provided with through rebound flow means, rebound valve means which cover compression side of said through rebound flow means, a cage member (34) fixed to the piston assembly at the compression side thereof and provided with at least one passage (341, 343) to allow free flow of working liquid between the compression chamber (8) and an internal chamber (344) of said cage member, a compression spring (95) preloaded between the compression side of said cage member (34) and said rebound valve means acting on said rebound valve means to normally close said compression side of said through rebound flow means, said orifice plate (33) further provided with an axial projection (334) and said through rebound flow means having a form of a number of rebound flow passages (332) disposed around said projection (334), and in that said rebound valve means comprise a deflectable disc (91) and an elliptical disc (92) disposed slidably one on top of the other over said axial projection (334), wherein a first mode of operation (alpha_A1) of the damper during rebound stroke corresponding to low piston assembly (3) velocity range is adjustable by at least one parameter selected from the width and diameters of the elliptical disc (92), the width and elasticity of the deflectable disc (91) and the external diameter of the spring seat (94), wherein a second mode of operation (alpha_A2) of the damper during rebound stroke corresponding to high piston assembly (3) velocity range is adjustable by at least one parameter selected from the number and the area of the rebound flow passages (332) in the cylindrical orifice plate (33), and wherein the velocity threshold (V_A) between the first (alpha_A1) and the second (alpha_A2) mode of operation of the damper during rebound stroke is adjustable by at least one parameter selected from the elasticity of the spring (95) and dimensions and material of an O-ring seal (93).

* * * * *